Patented Aug. 27, 1940

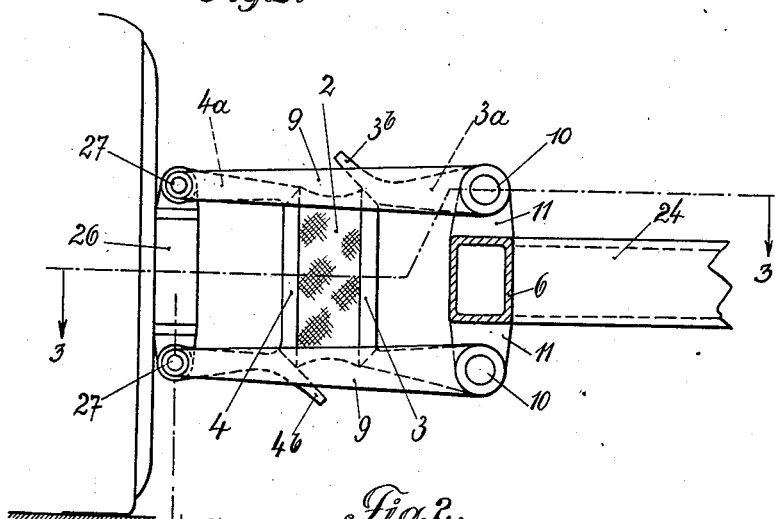
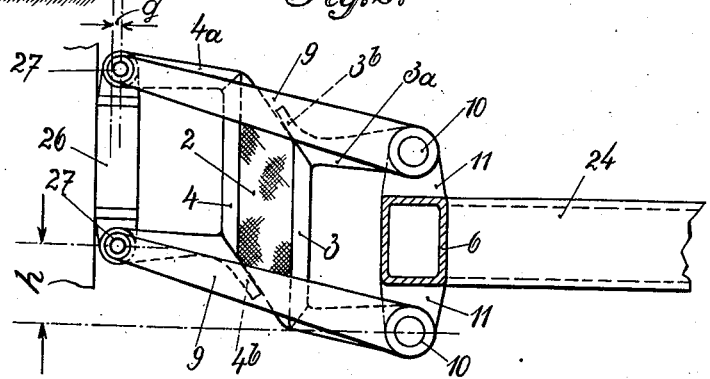
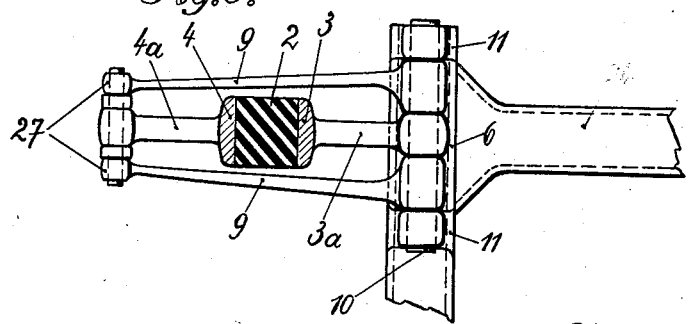

2,212,769

UNITED STATES PATENT OFFICE 2,212,769

SPRING SUSPENSION

Walter Boxan, Zschopau, Germany, assignor to Auto Union Aktiengesellschaft, Chemnitz, Germany Original application February 6, 1937, Serial No. 124,488. Divided and this application February 14, 1938, Serial No. 190,501. In Germany February 8, 1936.

6 Claims. (Cl. 267—21)

This application is a division of my earlier application Serial No. 124,488, filed February 6, 1937.

The object of the invention is to provide an improved spring suspension more particularly adapted for motor vehicles in which a rubber member is arranged between the stub axle carrier and the opposed portion of the vehicle frame.

In the accompanying drawing wherein an approved embodiment of the invention is illustrated:

Figure 1 is a front elevation of the improved spring suspension showing a fragment of the vehicle frame in section.

Figure 2 is a view similar to Fig. 1 showing the stub axle carrier in an elevated position.

Figure 3 is a horizontal section on the line 3—3 of Fig. 1.

Referring to the drawing in detail the numeral 26 designates the stub axle carrier of one of the wheels of a motor vehicle which is guided by means of pairs of parallel link members 9. The link members 9 are pivotally mounted at 10 to brackets 11 carried by the vehicle frame 24 and are pivotally connected at 27 to the stub axle carrier 26.

The rubber member 2 subjected to shear stresses is arranged between the stub axle carrier 26 and the frame member 6. For this purpose, the ends of U-shaped stirrups 3ª and 4ª are secured, respectively, to the pivot pins 10 and 27 and are arranged between the link members of the pairs 9, 9. The rubber member 2 is securely connected with the oppositely disposed webs 3, 4 of the stirrups and the latter are provided with obliquely projecting lugs 3ᵇ and 4ᵇ, the lug 3b carried by the stirrup 3 connected with the vehicle frame projecting upwardly and outwardly from said frame and the lug 4ᵇ projecting downwardly and inwardly from the vehicle frame.

As shown in Fig. 2, upon excessive deflection of the wheel, the lugs 3ᵇ and 4ᵇ engage the rubber member 2 and thereby limit the wheel deflection. Also during deflection of the wheel the webs 3 and 4 of the stirrup move into closer relation to each other to the extent of the distance designated at $g$ and thus a compression of the rubber is superposed on the shear stress which is applied thereto incident to the displacement of the wheel and this compression increases the resistance to excessive wheel deflection.

This arrangement of the rubber member 2 relieves the link 9 to a great extent of the stress imposed thereon by the weight of the load supported on the vehicle and therefore the weight and size of the link members may be reduced.

Instead of the wheel guiding arrangements illustrated, naturally other arrangements can be used, if in each case an axle part guided in the frame is directly connected with a frame member by the rubber member. The rubber members could also be provided in multiple arrangement, for example on both sides of the link member.

What I claim is:

1. A springing arrangement more particularly for motor vehicles with independent wheels, comprising a vehicle frame, a stub axle carrier, means guiding the movement of said axle carrier with respect to said frame, a U-shaped stirrup carried by said carrier projecting laterally therefrom towards said frame, a U-shaped stirrup carried by said frame projecting laterally therefrom toward said carrier, the free ends of said stirrups being spaced from one another, and a rubber member interposed between and securely connected with the free ends of said stirrups for connecting said axle carrier with said frame, said rubber member being subjected to shear stresses.

2. A springing arrangement for motor vehicles with independent wheels comprising a vehicle frame, an axle carrier, parallel links pivotally connected at their opposite ends to the frame and axle carrier, stirrups connected with the frame and axle carrier at the points of connection of said link members therewith, and a rubber member subjected to shear stresses securely connected to said stirrups.

3. A springing arrangement as claimed in claim 2, characterised in that said stirrups are of U-shape, said rubber member being secured to the web portions of said U-shaped stirrups.

4. A springing arrangement as claimed in claim 2 characterized in that said link members are arranged in pairs and said stirrups are arranged between the links of the respective pairs.

5. A springing arrangement as claimed in claim 2 characterized by the provision of lugs carried by said stirrups and arranged to abut against said rubber member during excessive deflection of the vehicle wheel.

6. A springing arrangement more particularly for motor vehicles with independent wheels, comprising a vehicle frame, a stub axle carrier, means guiding the movement of said axle carrier with respect to said frame, an abutment on said carrier projecting laterally therefrom towards said frame, an abutment on said frame projecting laterally therefrom toward said carrier, said abutments having laterally opposed spaced confronting faces, and an elastic member interposed between said faces and abutting thereagainst, whereby movement of said abutments toward one another upon deflection of the wheels will be resisted by said elastic member.

WALTER BOXAN.